June 14, 1932. J. M. SCHUTZ 1,862,910
APPARATUS FOR BURNING FUEL
Filed June 7, 1929 5 Sheets-Sheet 1
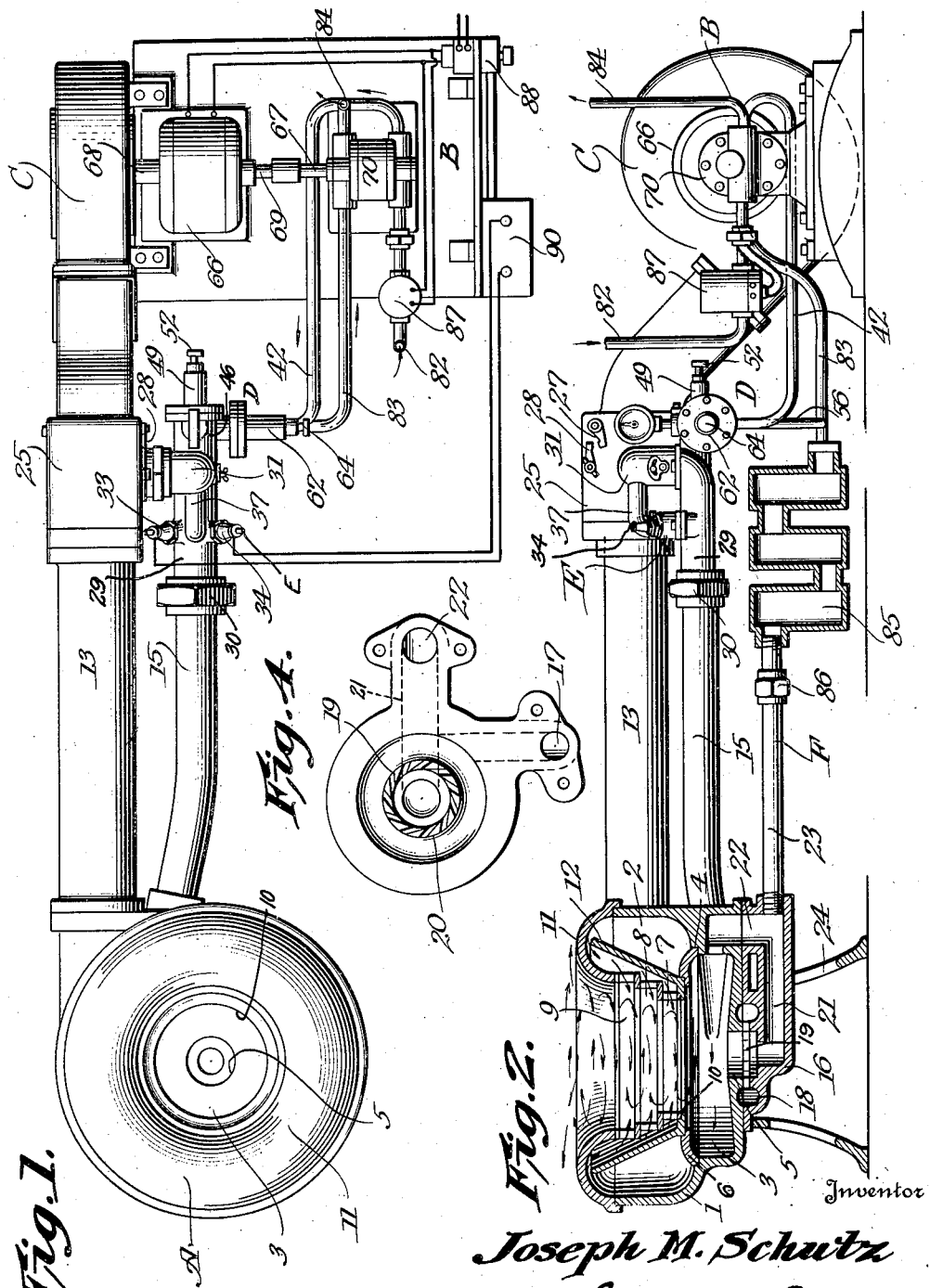
Inventor
Joseph M. Schutz
By Lloyd W. Batch
Attorney

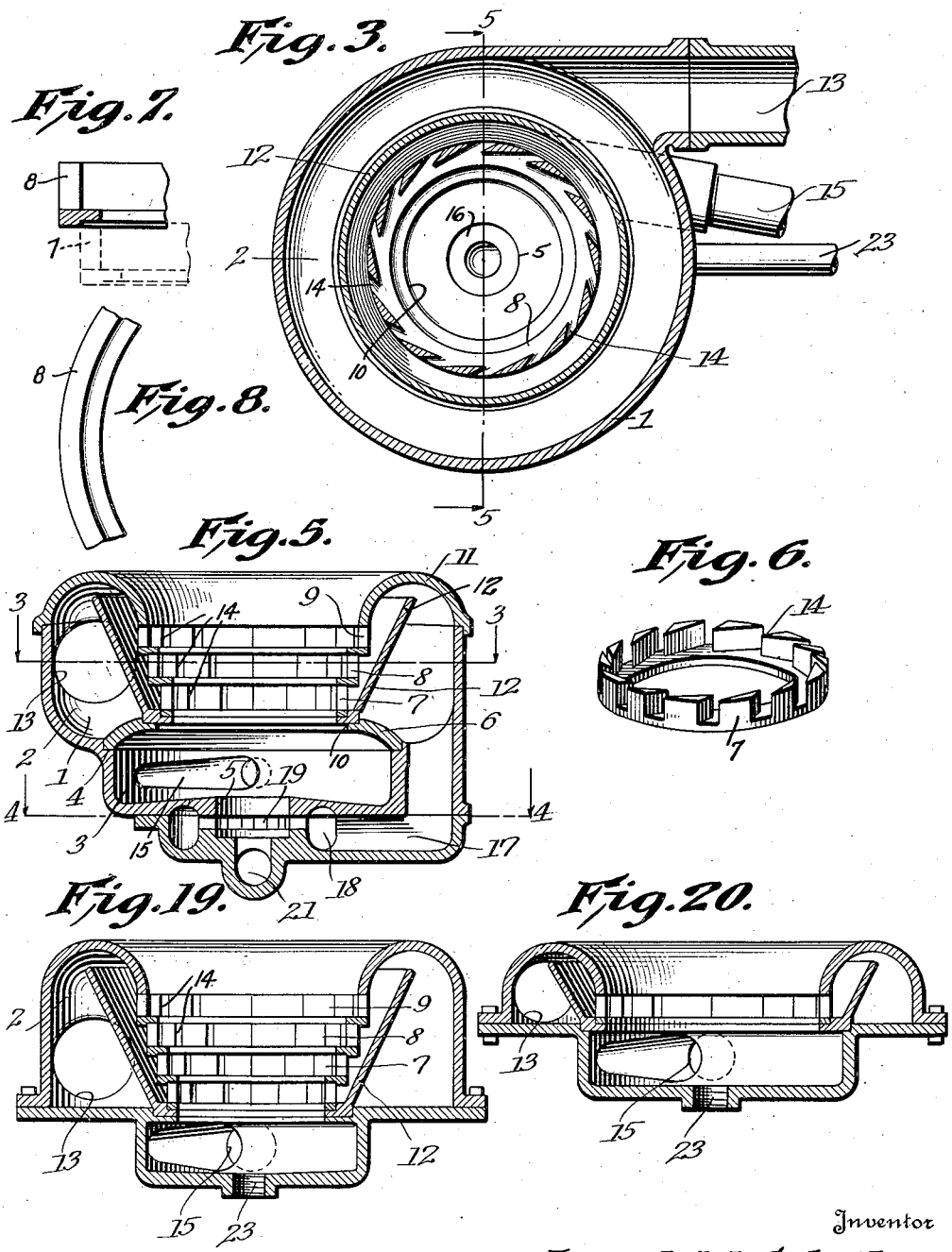

June 14, 1932. J. M. SCHUTZ 1,862,910
APPARATUS FOR BURNING FUEL
Filed June 7, 1929  5 Sheets-Sheet 3
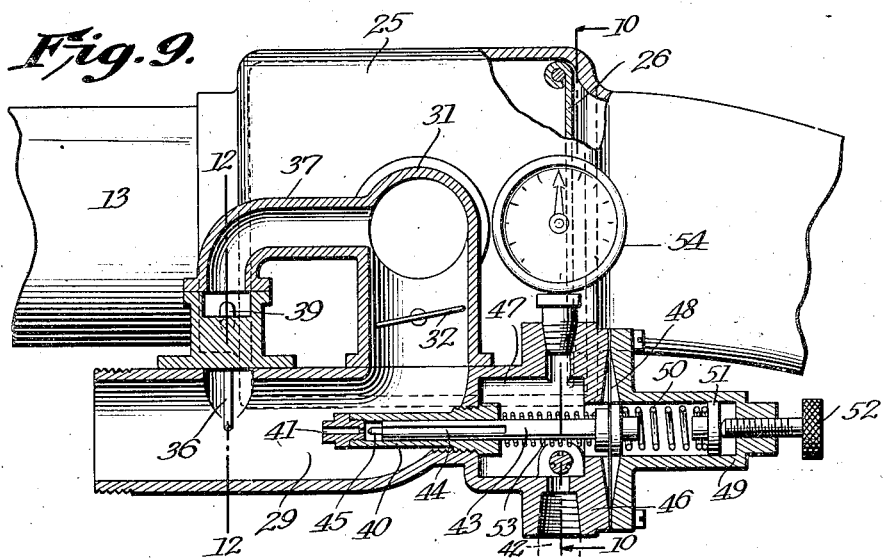
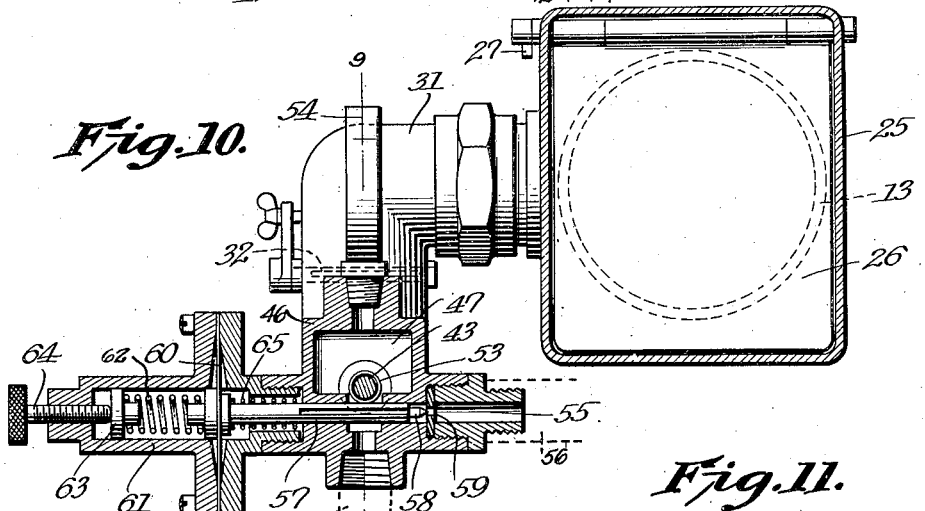
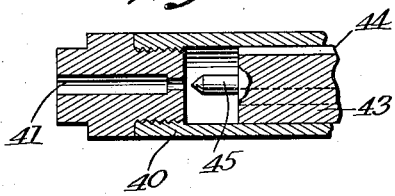
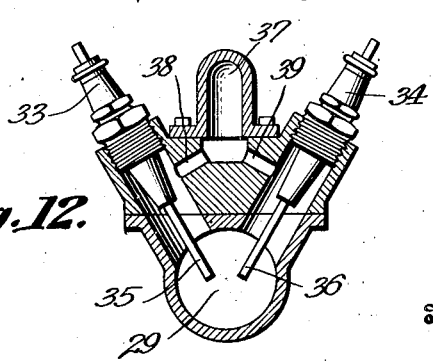
Inventor
Joseph M. Schutz
By Lloyd W. Patch
Attorney

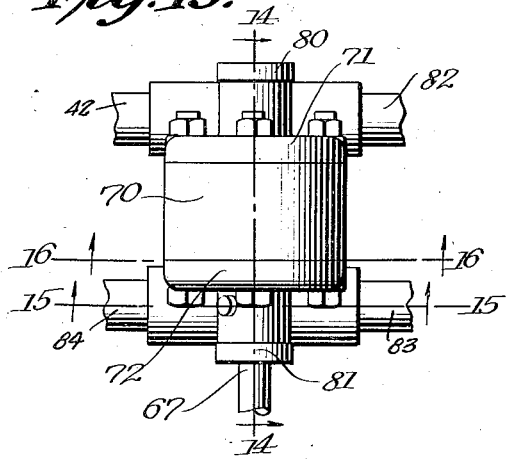
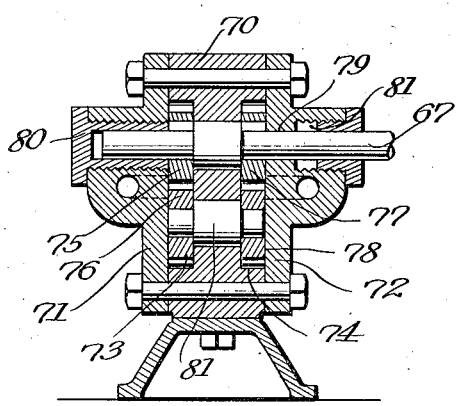
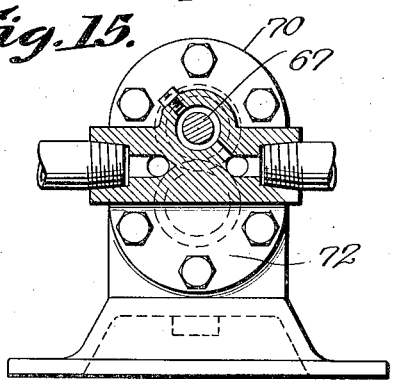
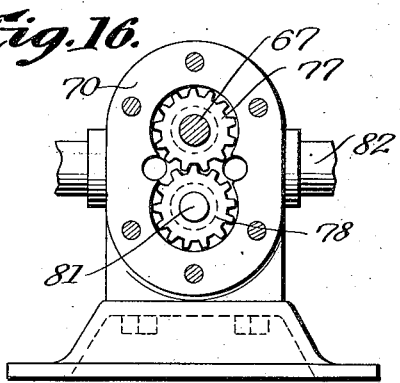
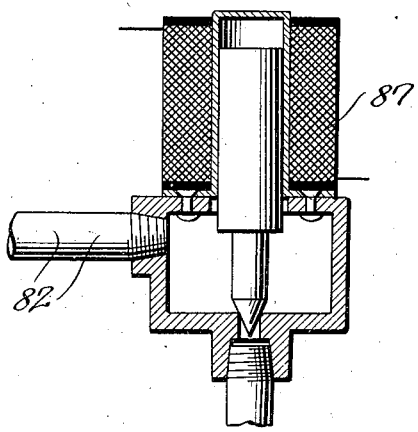

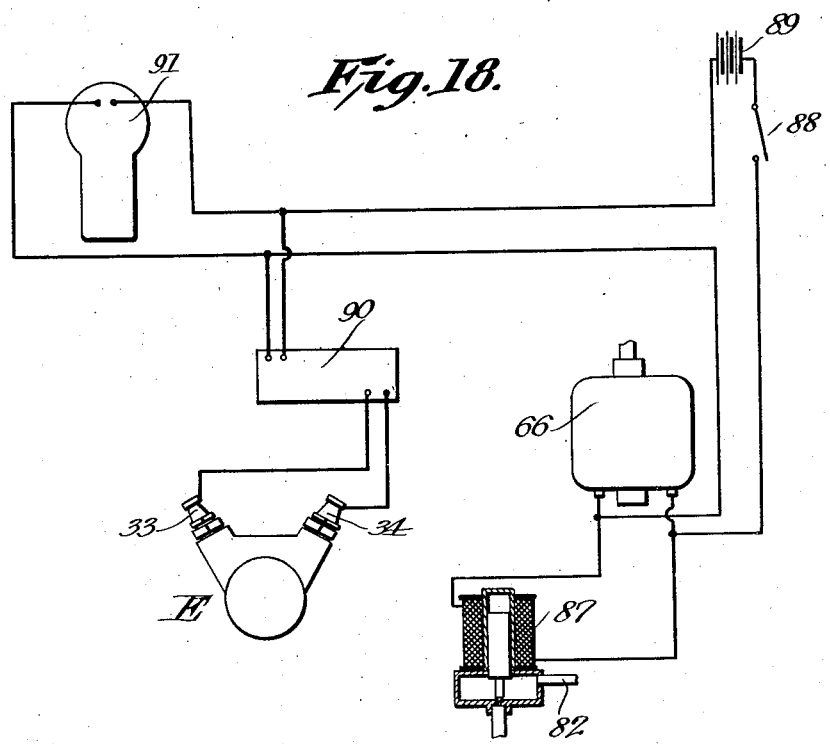
Fig.18.
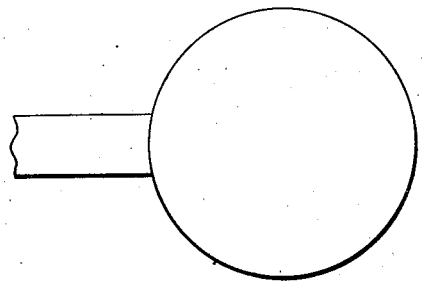

Patented June 14, 1932

1,862,910

UNITED STATES PATENT OFFICE

JOSEPH MARTIN SCHUTZ, OF NASHVILLE, TENNESSEE, ASSIGNOR TO THE RADIANT COMBUSTION ENGINEERING CO., OF NASHVILLE, TENNESSEE, A CORPORATION OF TENNESSEE

APPARATUS FOR BURNING FUEL

Application filed June 7, 1929. Serial No. 369,069.

My present invention relates to apparatus for burning fuel, and particularly to an apparatus intended for use in burning liquid fuel in the presence of pressure air to attain a high heating efficiency.

An object of this invention is to provide an apparatus including a fuel burner made entirely of metal to be placed within a furnace or heating chamber where it will be subjected to high temperatures and which has provision for air cooling, thus obviating the necessity for using refractory materials.

A further object is to provide an apparatus which can be used to secure complete and substantially perfect combustion at the mouth of a burner, thus producing a flat short flame, without a cone, which will give an intense heat diffused to accomplish most efficient heating results.

Another object is to provide an apparatus which insures the prompt and efficient elimination of any foreign matter or products of combustion, thus keeping the apparatus at all times in condition to carry out the process of complete and efficient combustion with highest efficiency and a maximum generation of usable B. t. u. for the amount of fuel consumed.

A further object is to provide a fuel burner having a gas generating chamber constricted at its outlet and having the air inlet opening thereinto at an angle from a radial line whereby fuel and air supplied through the inlet will be circulated within the generating chamber to break up the fuel to combine with the air following which it emerges at the outlet, and a casing member fitted concentrically at the outlet of the gas generating chamber and provided with air inlet passages for introduction of augmenting air to unite with the emerging gas to form a combustible mixture.

Still another object is to provide for the burning of fuel in accordance with my invention which consists in injecting a stream of fuel and air for decomposing the same into a gas producing chamber to there be sufficiently confined to circulate for a period sufficient for decomposition of the fuel, and to then emerge in a gaseous stream toward a burner, and positively introducing additional air into the gas to attain substantially perfect combustion proportions as the burner is reached.

A further object is to provide a burner comprising a burner annulus closed at one end and flared toward an open combustion end, said burner annulus being provided with a fuel inlet at the closed end and having multiple air inlets along the extent of the flared portion of increased capacity toward the combustion end.

Yet another object is to provide a burner housing which takes heat from the combustion of the fuel to maintain a proper operating temperature for most efficient volatization of the fuel and complete combustion at the burner opening, and which contemplates the use of air to cool the parts to prevent overheating and with subsequent use of air thus heated to support combustion and consequently increase the heating efficiency of the burner.

Another object is to provide an apparatus including a system which has means for initial forming and ignition of the fuel supply until the apparatus is sufficiently heated for self-generation and ignition, and in providing for automatically cutting out this initial operating means when full operation is attained, and in fact for complete automatic control of the apparatus when in use.

Another object resides in providing a mechanism of such character that excess oil supplied to the burner will be pumped back to the source of supply, and all the oil will be returned back in case the ignition does not function, thus eliminating the possibility of oil flooding and the consequent dangers of fire and explosions.

Another object lies in so constructing the burner mechanism that a vortex is created in the gas forming chamber to set up a whirling and mixing action to secure proper volatilization of the fuel.

An additional object is to provide a burner structure which is scientifically proportioned for progressive expansion and addition and combination of air to attain a theoretically perfect combustible mixture at the flame point.

Still another purpose of this invention is to provide a burner structure having the inlets thereof arranged to maintain substantially constant and uniform whirling expansion and mixing circulation in all parts of the volume of mixture as the gas travels towards and is supplied to the flame.

A still further purpose lies in providing a metering or oil control mechanism which insures a metered and regulated supply of oil which is self cleaning, and which can be set to suit different characters of fuel and different operating conditions.

With the above and other objects in view which will be apparent to those skilled in the art, my invention includes certain novel features of construction, combinations and assemblies of parts, and processes and steps which will be hereinafter set forth in connection with the drawings and then pointed out in the claims.

In the drawings:

Figure 1 is a view in top plan of an apparatus constructed in accordance with my invention.

Fig. 2 is a view in side elevation of the apparatus with portions in section to better illustrate the construction and arrangement of the parts.

Fig. 3 is a horizontal sectional view through the burner substantially on line 3—3 of Fig. 5.

Fig. 4 is a horizontal sectional view on line 4—4 of Fig. 5.

Fig. 5 is a vertical sectional view on line 5—5 of Fig. 3.

Fig. 6 is a view in perspective showing one of the tuyère rings.

Fig. 7 is a detail sectional view showing the fitting of a pair of tuyère rings.

Fig. 8 is a fragmentary view in bottom plan of one of the tuyère rings.

Fig. 9 is a fragmentary detail view, partly in section, on line 9—9 of Fig. 10, showing the metering or oil control device.

Fig. 10 is a sectional view on line 10—10 of Fig. 9.

Fig. 11 is a fragmentary detail sectional view to better show the fluid oil control valve.

Fig. 12 is a sectional view on line 12—12 of Fig. 9.

Fig. 13 is a view in top plan of the fluid fuel pump.

Fig. 14 is a vertical sectional view substantially on line 14—14 of Fig. 13.

Fig. 15 is a vertical sectional view on line 15—15 of Fig. 13.

Fig. 16 is a sectional view taken vertically on line 16—16 of Fig. 13.

Fig. 17 is a fragmentary view to better show the arrangement of the liquid fuel supply control.

Fig. 18 is a diagrammatic view illustrating an electric and thermal control system particularly adapted for my apparatus.

Fig. 19 is a vertical sectional view similar to Fig. 5 showing a modified form of burner.

Fig. 20 is a transverse vertical sectional view showing another modified construction.

In the present instance I have illustrated my improved apparatus as adapted for the burning of oil or liquid fuels, but as the description progresses it will be apparent that the apparatus might be well adapted for burning of powdered or comminuted fuels, with slight variations.

I have here shown a burner structure of the type which might be applied for use in conjunction with domestic furnaces or heating boilers of the steam, vapor or hot water types, and the mechanism is so constructed, arranged, and assembled, that the burner portion will be located in the fire box or other suitable portion of the heating plant and the operating mechanism will be located outside of the heating plant. The burner structure, generally indicated at A, is supplied with oil or other liquid fuel from a pump generally indicated at B, air being supplied under pressure by blower C. The supply of oil is controlled by a metering device D, initial ignition being accomplished through an arrangement of firing plugs at E. While the metering device is indicated to take care of and substantially prevent excess supply of oil or fuel, an oil return F is provided for safety in case of improper functioning and the pump B also functions to return the excess oil to the supply. In order that the operation of my improved apparatus may be automatic, it is preferable that a complete electrical or other control be provided, and one form of such a control apparatus will be set forth more in detail as the description progresses.

The burner has an annular rim or case 1 formed on two diameters to provide an air chamber 2 and a restricted gas generating chamber 3, with a shoulder 4 between the two chambers. The gas generating chamber 3 has the bottom thereof raised in a substantially flat conical form toward the center, and an injection opening 5 is provided at the center, which would be the apex of the flattened conical bottom. A ring plate 6 is fitted in the shoulder 4 to form a crowned up top for the gas generating chamber with a restricted central opening through which the expanding gases within the generating chamber can escape upwardly. A burner annulus made up of the tuyère rings 7, 8 and 9 is mounted concentrically around the opening 10 in the ring plate 6, these tuyère rings being successively of larger internal diameter to thus give a substantially flared form to the burner annulus. A burner ring 11 of crowned up form in cross section is fitted to close down against the upper edge of the burner case 1 and against the upper tuyère ring 9 to thus form a top for air chamber 2. A baffle ring 12 is located in the air chamber 2 with its lower edge bearing upon the ring plate 6 and its upper edge terminating short of contact with the burner ring 11 to thus leave an air passage over the top of the plate.

A main air supply duct 13 leads to the air chamber 2 to open tangentially thereinto as best shown in Fig. 1, and air supplied under pressure through this air duct to air chamber 2 will flow over the top of the baffle ring 12 and then through the air injection openings 14 of the tuyère rings. As best shown in Figs. 3 and 6, the air injection openings 14 are formed through the tuyère rings to inject air into the burner annulus in substantially tangential jets or streams so that a whirling motion will be maintained, thus causing circulation and agitation of the augmenting air and the gas expanding through opening 10. As the burner annulus is of substantially spread or tapered form from the opening 10 to the burner ring 11, the gas and air are permitted greater room for expansion and, in line with my purpose to secure as nearly a perfect mixture as possible at the flame point within the burner ring, I increase the collective area of the augmenting air injection passages in the several tuyère rings progressively from the opening 10 toward the burner ring 11, thus increasing the supply of augmenting air as the mixture is circulated and is better prepared to take up the air and mix the same with the expanding gas.

A firing tube 15 leads to the gas generating chamber 3 and opens thereinto tangentially. Thus, as a rich mixture is supplied through this firing tube to discharge into the generating chamber, the mixture will be whirled within the generating chamber and heavier particles will be carried out by centrifugal force to contact with the side walls of the generating chamber. In the use of my apparatus and in carrying out my improved method, liquid fuel and a volume of air sufficient to decompose the same into a rich gaseous mixture will be supplied through firing tube 15 and particles of the liquid fuel will be carried out to contact with the wall of the chamber 3, the mixed air and rich gas being caught in a vortex in the center of the generating chamber and expanding up through the opening 10. On the lower side of the burner case 1 I mount an oil return and auxiliary air supply case 16 having a central opening and passage registering with the opening 5 in the bottom of the generating chamber 3. An air duct 17 leads from air chamber 2 to an annular duct 18 in this auxiliary case 16. The annular duct 18 is around the central opening 5 and an air supply ring 19 is located adjacent the annular duct 18 and is provided with tangential air supply openings 20 so that air will be injected at the opening 5 with a whirling force to rise through the center of the generating chamber and aid in the agitation and breaking down of the charge within the generating chamber to secure a better mixture of the rich gas, rising through opening 10. This action may be still further aided by providing a passage 21 in the case 16 opening at one end in line with opening 5 and having its remaining end registering with passage 22 leading laterally from the generating chamber. As the mixture is circulated and whirled within the generating chamber 3, a portion of the rich gas will find its way through passages 22 and 21 to be discharged vertically up through opening 5 in the bottom of the generating chamber, and at the same time this stream of gas injected centrally into the generating chamber will be subject to the stirring and augmenting influences of the air injected tangentially through the openings 20. An oil return pipe 23 is connected with passage 21, and any excess quantity of oil accumulating in the generating chamber 3 will drain through the passage 21 into this pipe 23. Further, if the burner should cease to function properly through the flame or firing mechanism being extinguished, or for any other cause, all danger of flooding, explosions, or fire will be eliminated as the excess oil will be drained off through pipe 23.

This burner structure might be mounted on a suitable base 24, or can be otherwise supported or mounted within the fire box or other appropriate part of the furnace or heating plant, and to facilitate installation it is preferable that the main air duct 13, the firing tube 15, and the oil return pipe 23 be each provided with a union or other readily detachable connection at its outer end.

The blower C is connected with a valve box 25, and this valve box is in turn connected with the main air duct 13 by a union or other readily detachable coupling. A flap valve 26 is mounted at the end of the valve box 25 nearest the blower C to close by gravity and to be opened by the air pressure. An arm 27 on the pivot shaft of this flap valve 26 is adapted to engage with an adjustable stop 28 which can be manually set to limit the degree of opening of the valve 26. This valve will be opened by the air pressure during normal operation of the burner but will swing down to a closed position when the blower C ceases to operate.

A firing plug case 29 is connected by coupling 30 with the firing tube 15, and this firing plug case 29 has an air pipe 31 leading laterally therefrom to connect with the valve box 25, a butterfly valve 32 being mounted in this pipe 31 to permit manual control and regulation of the amount of air supplied from the valve box through pipe 31, firing plug case 29 and consequently to the firing tube 15. The firing plug arrangement, as best shown in Fig. 12, consists of the two insulated plugs 33 and 34 mounted in suitable openings in the case structure 29, and these plugs carry electrodes 35 and 36 which have their inner ends extended to terminate in the middle of the case 29, the electrodes being spaced to form a gap so that when high tension current is passed through the electrodes a spark will jump the gap. A branch air pipe 37 has ducts 38 and 39 opening adjacent the firing plugs, to blow air around the same to prevent overheating and to guard against accumulation of carbon, or other matter which might foul the plugs.

An oil supply nozzle 40 projects into the firing plug casing 29 at a point substantially in axial alinement with the firing tube 15, and a jet fixture 41 is provided so that oil sprayed from said nozzle will be discharged in a fine mist adjacent the electrodes 35 and 36. The oil pump B is adapted to supply oil under pressure to the nozzle 40 through pipe 42, but it is desirable that means be provided to regulate and govern the pressure at which the oil is injected through the spray fitting 41, and to so arrange the parts that when the pump is not in operation the spray fitting will be closed. With this in mind I provide a cylindrical bore within the nozzle 40 and mount therein a plunger 43 having a grooved portion 44 adapted to slide within the cylindrical bore and a needlepoint 45 to close in the inner end of the opening of the spray fitting 41. An oil metering casing 46 is provided around the outer end of the nozzle 40 and has an oil reserve chamber 47 therein with which the oil supply pipe 42 connects to supply oil under pressure from oil pump B. A diaphragm 48 is mounted on the outer end of the plunger rod 43 and is positioned to be influenced by the oil pressure within the chamber 47 to withdraw the plunger rod sufficiently to unseat the needlepoint 45 from the opening of the spray fixture 41. This diaphragm 48 is held in place by a cap 49 which has a coil spring 50 fitted therein to bear against the outer side of the diaphragm. A pressure washer 51 is in contact with the other end of spring 50 and an adjusting screw 52 is fitted through a threaded opening in the cap 49 to bear against this pressure washer 51. With this arrangement it is possible to vary the resilient pressure exerted by spring 50 through adjustment of screw 52, to thus vary the pressure required upon diaphragm 48 to move the plunger rod 43 to open the spray fitting. A coil spring 53 is provided around the plunger rod 43 on the inner side of the diaphragm to make the action of the same stable. A pressure gauge 54 is connected in connection with chamber 47 to give visible readings of the pressure of the oil therein.

As better shown in Fig. 10, a blow-off opening 55 is provided from the oil chamber 47 and an oil return pipe 56 is connected therewith. A plunger rod 57, serving as a blow-off valve, has a needlepoint 58 working adjacent an opening 59 establishing communication to this blow-off passage 55. A diaphragm 60 held in place in cap 61 is connected with the other end of the plunger 57 to be influenced by the pressure of fuel oil within chamber 47 to move the plunger rod sufficiently to unseat the needlepoint 58 from the passage or opening 59. A coil spring 62 is fitted within the cap 61 to bear at one end against the diaphragm and this coil spring bears at its remaining end at pressure nut 63, which is adjusted through adjusting screw 64. A coil spring 65 is provided around the plunger rod 57 on the opposite side of the diaphragm 60. With this arrangement of the parts it is possible to manually adjust the resilient pressure exerted by spring 62 upon diaphragm 60 to hold the needlepoint 58 in the closed position, and such adjustments will consequently vary the blow-off pressure required within the chamber 47 to work against the diaphragm 60 and move plunger rod 57 to open the passage 59 to the blow-off. With this arrangement, it is possible to regulate and vary the pressure and the amount of oil supplied through the spray fitting 41, and the pressure gauge 54 will give visible indications to permit accurate and precise manual settings for most efficient operation.

The pump B, as better shown in Figs. 13 to 16, inclusive, is of the direct drive gear type, and is constructed to have high and low pressure sides for pumping oil under pressure and for returning oil coming from the metering device D and excess or dripping oil which may be caught in the generating chamber, and this pump mechanism is so arranged that leakage of oil on the high pressure side is positively precluded.

The pump B and blower C are operated by an electric motor 66, the shaft 67 of the pump and shaft 68 of the blower being directly connected with the motor shaft 69.

The pump case 70 has heads 71 and 72 bolted or otherwise rigidly secured thereto on the high and low pressure sides respectively, and adjacent these heads the case is chambered at 73 and 74 to receive the pump gears 75 and 76 for the high pressure side and pump gears 77 and 78 for the low pressure side. The head 72 on the low pressure side has a bearing opening 79 to receive and journal the pump shaft 67, and head 71 has an alined opening internally screw-threaded to receive a bearing cap 80 which journals the end of pump shaft 67 and positively closes the pump case around this end of the shaft. Pump gears 75 and 77 are keyed or otherwise secured to the shaft 67, and pump gears 76 and 78 are carried by a shaft 81 mounted in a suitable opening provided in the pump case 70. A groove is provided at 81' around the pump shaft 67 at the low pressure side to prevent escape of oil through the bearing 79, and discharges back to the intake side of the pump.

Oil supply pipe 82 leading from a tank or other suitable source of supply of oil is connected with the pump casing head 71 and oil pipe 42 leads from the high pressure side. Return oil pipe 83 connects with the intake on the low pressure side and a pipe 84 leads from the low pressure outlet to discharge into the tank or other receptacle where the excess oil is to be stored. With the pump constructed in the manner set forth the high pressure side of the case is entirely closed except for the inlet and outlet, thus positively precluding the loss of oil, and pressure, through leakage. While the shafts 67 and 81 will be given a close fit under the high pressure a certain small amount of oil may leak through the shaft bearing, but this will only serve to lubricate the shafts and this leaking oil will be immediately taken care of on the low pressure side to be returned through discharge pipe 84.

An oil sump 85 has a circuitous path or passage to form a trap, and the oil return pipe 23 from the generating chamber is connected with one end of this oil sump adjacent the top through the use of a union 86, or other suitable coupling. The pipe 83 connects with the opposite end of the oil sump adjacent the bottom, and excess oil pipe 56 connects with this return pipe 83.

It is preferable that an electromagnetically operated valve 87, the construction of which is best shown in Fig. 17, be connected in the oil pipe 82 from the oil supply tank, or other source of supply, this valve to be normally closed when the electromagnetic means is deenergized. In Fig. 18 I have illustrated diagrammatically a control system which might be employed to advantage in the use of my improved apparatus. As shown, the valve 87 and the motor 66 are included in the same general electric wiring circuit controlled by switch 88, and receiving energy from a storage battery 89, or other suitable source of supply. This same circuit also directly connects with the firing plug mechanism at E, a spark coil or other high tension transformer mechanism being introduced at 90 into this circuit to give the desired intensity of the spark. A room temperature thermostat 91, adapted to be located in a living room or other space to be heated is connected in the general circuit and when the maximum temperature as set at this room thermostat is reached, the circuit will be broken and the burner will be rendered inoperative.

In the use of my improved burner structure it is the intention that the liquid fuel shall be introduced into the gas generating chamber with substantially only one-fourth of the air required to give a theoretically perfect combustible gas, and as the gas rises through the burner annulus each of the tuyère rings 7, 8 and 9 will successively supply an additional one-fourth of the required air, until the full amount of air has been supplied and has been agitated with the initial gas mixture before the point of combustion is reached, at the burner ring 11. It has been found that a much better mixture of air and hydrocarbons is obtained by this proportionate and successive introduction of augmenting air as the gas volume is permitted to expand in the upwardly tapered or flared burner annulus, and when the point of full combustion is reached at the burner ring 11, the whirling mass of gas will burn with a low flat radiant flame.

As shown in Figs. 19 and 20, a greater or less number of tuyère rings might be employed to suit different or particular conditions of operation and use.

In carrying out the process of burning fuel in accordance with my present invention, the apparatus above described can be used to excellent advantage as the fuel is supplied in a stream so directed as to allow for progressive expansion, and augmenting air is introduced in increasing volume during the progress of the stream to attain substantially perfect combustion proportions as the combustion point is reached.

While I have herein shown and described only certain specific embodiments of my invention, certain possible mechanical constructions and combinations, and certain steps in the carrying out of the process or method, it will be appreciated that many changes and variations can be resorted to without departing from the spirit and scope of my invention.

I claim:

1. A fuel burner comprising a gas generating chamber having a restricted outlet and an inlet opening thereinto at an angle from a radial line, means to inject fuel through the inlet opening in a blast tangentially into the generator chamber to circulate therein and escape through the outlet, a burner annulus fitted concentrically around the restricted outlet of the gas generating chamber and provided with tangential air inlet passages, and means to introduce air under pressure in a stream substantially axially through said generating chamber and the outlet thereof.

2. A fuel burner comprising a gas generating chamber having a restricted outlet and an inlet opening thereinto at an angle from a radial line, means to inject fuel through the inlet opening in a blast tangentially into the generator chamber to circulate therein and escape through the outlet, a burner annulus fitted concentrically around the restricted outlet of the gas generating chamber and provided with tangential air inlet passages, means to introduce air under pressure in a stream substantially axially through said generating chamber and the outlet thereof, and means to introduce air under pressure through said air inlet passages.

3. A fuel burner comprising a gas generating chamber restricted at its outlet and having an inlet opening thereinto at an angle from a radial line, tangentially opening tuyère means to create a vortex at a point opposite the outlet and traveling toward the same, and a burner annulus fitted concentrically at the outlet of the gas generating chamber and provided with air inlet passages along the extent thereof.

4. A fuel burner comprising a gas generating chamber restricted at its outlet and having an inlet opening thereinto at an angle from a radial line, tangentially opening tuyère means to create a vortex at a point opposite the outlet and traveling toward the same, a burner annulus fitted concentrically at the outlet of the gas generating chamber and provided with air inlet passages along the extent thereof, and means to introduce air through said inlet passages tangentially in line with the vortex.

5. A fuel burner comprising a gas generating chamber restricted at its outlet and having an inlet opening thereinto at an angle from a radial line, tangentially opening tuyère means to create a vortex at a point opposite the outlet and traveling toward the same, a burner annulus fitted concentrically at the outlet of the gas generating chamber and provided with air inlet passages along the extent thereof, means to introduce air through said inlet passages tangentially in line with the vortex, and means to introduce air under pressure into the generating chamber axially in line with the outlet opening.

6. A fuel burner comprising a gas generating chamber of annular form having a restricted outlet opening substantially axially and having an inlet opening through the side wall at an angle from a radial line, a burner annulus fitted concentrically around the restricted outlet and flared toward an open combustion end, said burner annulus being provided with multiple air inlets opening tangentially along the extent of the flared portion and of progressively increased capacity toward the combustion end, means to introduce fuel through the inlet to escape as a rich gas through the restricted outlet, means to introduce air under pressure through the inlet passages of the burner annulus to combine with the rich gas and form a substantially perfect mixture at the combustion end, and tangentially opening tuyère means to circulate gas within the generating chamber and create a vortex traveling toward the outlet.

7. A fuel burner comprising a gas generating chamber of annular form having a restricted outlet opening substantially axially and having an inlet opening through the side wall at an angle from a radial line, a burner annulus fitted concentrically around the restricted outlet and flared toward an open combustion end, said burner annulus being provided with multiple air inlets opening tangentially along the extent of the flared portion and of progressively increased capacity toward the combustion end, means to introduce fuel through the inlet to escape as a rich gas through the restricted outlet, means to introduce air under pressure through the inlet passages of the burner annulus to combine with the rich gas and form a substantially perfect mixture at the combustion end, tangentially opening tuyère means to circulate gas within the generating chamber and create a vortex traveling toward the outlet, and means to introduce a limited quantity of pressure air substantially axially into the generating chamber.

8. An apparatus for burning fuel comprising a burner having a gas generating chamber and provided with a flared burner annulus having tangential air passages opening through the sides thereof, a firing tube connecting with the generating chamber, a main air duct to supply air through the tangential air passages, a liquid fuel spray nozzle, positioned to discharge substantially centrally into the firing tube, a blower to supply air through the main air duct and a limited quantity of air through the firing tube to mix with the spray from the nozzle, a pump to supply liquid fuel to said nozzle, firing plugs having their firing points substantially in the path of the spray from said nozzle, electrically actuated means to operate the blower and the fuel pump, an electromagnetically opened valve normally closing the fuel supply to the pump, and an electric circuit connecting the firing plugs and the electrically actuated and operated means.

9. An apparatus for burning fuel comprising a burner having a gas generating chamber and provided with a flared burner annulus having tangential air passages opening through the sides thereof, a firing tube connecting with the generating chamber, a main air duct to supply air through the tangential air passages, a liquid fuel spray nozzle, positioned to discharge substantially centrally into the firing tube, a blower to supply air through the main air duct and a limited quantity of air through the firing tube to mix with the spray from the nozzle, a pump to supply liquid fuel to said nozzle, firing plugs having their firing points substantially in the path of the spray from said nozzle, electrically actuated means to operate the blower and the fuel pump, an electromagnetically opened valve normally closing the fuel supply to the pump, an electric circuit connecting the firing plugs and the electrically actuated and operated means, and means to control the circuit connections.

10. An apparatus for burning fuel comprising a burner having a gas generating chamber and provided with a flared burner annulus having tangential air passages opening through the sides thereof, a firing tube connecting with the generating chamber, a main air duct to supply air through the tangential air passages, a liquid fuel spray nozzle, positioned to discharge substantially centrally into the firing tube, a blower to supply air through the main air duct and a limited quantity of air through the firing tube to mix with the spray from the nozzle, a pump to supply liquid fuel to said nozzle, firing plugs having their firing points substantially in the path of the spray from said nozzle, electrically actuated means to operate the blower and the fuel pump, an electromagnetically opened valve normally closing the fuel supply to the pump, an electric circuit connecting the firing plugs and the electrically actuated and operated means, a return pipe to drain excess liquid fuel from the gas generating chamber, a sump to collect the excess liquid fuel, and a return connection from said sump to the fluid pump.

11. An apparatus for burning fuel comprising a burner having a gas generating chamber and provided with a flared burner annulus having tangential air passages opening through the sides thereof, a firing tube connecting with the generating chamber, a main air duct to supply air through the tangential air passages, a liquid fuel spray nozzle, positioned to discharge substantially centrally into the firing tube, a blower to supply air through the main air duct and a limited quantity of air through the firing tube to mix with the spray from the nozzle, a pump to supply liquid fuel to said nozzle, firing plugs having their firing points substantially in the path of the spray from said nozzle, electrically actuated means to operate said blower and said pump, a valve normally closing the liquid supply to the pump and electrically actuated to open the supply, electric circuit connections to said electrically actuated portions and the firing plugs, means to control said circuit, and a valve to close said main air duct when the blower is inactive.

12. An oil burner comprising a burner casing having an air chamber in the upper portion thereof and a generating chamber in the lower portion, with a shoulder intermediate, a firing tube opening tangentially into the generating chamber, an air duct opening tangentially into the air chamber, a ring plate mounted at said shoulder to form a restricted gas outlet opening from said generating chamber, a plurality of tuyère rings of successively increased diameter and having tangential air passages through the side wall thereof mounted concentrically one upon the other to be supported by the ring plate around the gas discharge opening for the generating chamber, a burner ring mounted on the uppermost tuyère ring and the upper edge of the casing to close the air chamber, a baffle ring mounted on the ring plate within the air chamber, means to introduce liquid fuel through the firing tube, and means to introduce air through the air duct and in limited quantities through the firing tube.

13. An oil burner comprising a burner casing having an air chamber in the upper portion thereof and a generating chamber in the lower portion, with a shoulder intermediate, a firing tube opening tangentially into the generating chamber, an air duct opening tangentially into the air chamber, a ring plate mounted at said shoulder to form a restricted gas outlet opening from said generating chamber, a plurality of tuyère rings of successively increased diameter and having tangential air passages through the side wall thereof mounted concentrically one upon the other to be supported by the ring plate around the gas discharge opening for the generating chamber, a burner ring mounted on the uppermost tuyère ring and the upper edge of the casing to close the air chamber, a baffle ring mounted on the ring plate within the air chamber, means to introduce liquid fuel through the firing tube, means to introduce air through the air duct and in limited quantities through the firing tube, said casing having an opening through the bottom of the gas generating chamber through which excess oil may pass, and means to introduce augmenting air through this bottom opening.

14. An oil burner comprising a burner casing having an air chamber in the upper portion thereof and a generating chamber in the lower portion, with a shoulder intermediate, a firing tube opening tangentially into the generating chamber, an air duct opening tangentially into the air chamber, a ring plate mounted at said shoulder to form a restricted gas outlet opening from said generating chamber, a plurality of tuyère rings of successively increased diameter and having tangential air passages through the side wall thereof mounted concentrically one upon the other to be supported by the ring plate around the gas discharge opening for the generating chamber, a burner ring mounted on the uppermost tuyère ring and the upper edge of the casing to close the air chamber, a baffle ring mounted on the ring plate within the air chamber, means to introduce liquid fuel through the firing tube, means to introduce air through the air duct and in limited quantities through the firing tube, said casing having an opening through the bottom of the gas generating chamber through which excess oil may pass, means to introduce augmenting air through this bottom opening, and means to return excess oil which may pass through the bottom opening.

In testimony whereof I hereunto affix my signature.

JOSEPH MARTIN SCHUTZ.